United States Patent
Dharmadhikari et al.

(10) Patent No.: US 9,652,216 B2
(45) Date of Patent: May 16, 2017

(54) SYSTEM AND METHOD FOR PROVIDING OUT-OF-BAND SOFTWARE OR FIRMWARE UPGRADES FOR A SWITCHING DEVICE

(71) Applicant: DELL PRODUCTS L.P., Round Rock, TX (US)

(72) Inventors: Vivek Dharmadhikari, San Jose, CA (US); Haresh K. Shah, Los Altos Hills, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 226 days.

(21) Appl. No.: 13/645,240

(22) Filed: Oct. 4, 2012

(65) Prior Publication Data
US 2014/0101653 A1    Apr. 10, 2014

(51) Int. Cl.
G06F 9/44    (2006.01)
G06F 9/445    (2006.01)

(52) U.S. Cl.
CPC ..................................... *G06F 8/65* (2013.01)

(58) Field of Classification Search
None
See application file for complete search history.

(56) References Cited

U.S. PATENT DOCUMENTS

| | | | | |
|---|---|---|---|---|
| 5,889,965 | A * | 3/1999 | Wallach et al. | 710/302 |
| 6,985,431 | B1 * | 1/2006 | Bass et al. | 370/235 |
| 8,078,865 | B2 * | 12/2011 | Brumley et al. | 713/100 |
| 8,201,161 | B2 * | 6/2012 | Challener et al. | 717/168 |
| 8,417,774 | B2 * | 4/2013 | Flynn et al. | 709/204 |
| 8,589,908 | B2 * | 11/2013 | Subbakrishna et al. | 717/173 |
| 8,856,772 | B2 * | 10/2014 | Fan | 717/168 |
| 2005/0229173 | A1 * | 10/2005 | Mihm | G06F 8/65 717/171 |
| 2006/0168189 | A1 * | 7/2006 | Huang | H04L 67/125 709/223 |
| 2007/0043833 | A1 | 2/2007 | Lu et al. | |
| 2007/0288737 | A1 * | 12/2007 | Boyle | G06F 8/65 713/1 |
| 2013/0117766 | A1 * | 5/2013 | Bax et al. | 719/323 |

(Continued)

OTHER PUBLICATIONS

Xilinx, Title—"What is Programmable Logic", pp. 1-2, Dec. 29, 2011.*

(Continued)

*Primary Examiner* — Insun Kang
(74) *Attorney, Agent, or Firm* — Haynes & Boone, LLP

(57) ABSTRACT

An information handling system is provided. The information handling system includes at least one network switch that includes at least one processing unit, a memory coupled to the at least one processing unit, the memory storing at least one image including instructions controlling functions of the at least network switch, and a baseband management controller coupled to the memory and the at least one processing unit, the baseband management controller receiving and storing at least one upgraded image for writing to the memory to replace the at least one image. The baseband management controller receives the at least one upgraded image from a remote terminal, powers off the at least one processing unit, and writes the at least one upgraded image to the memory while the at least one processing unit is powered off.

20 Claims, 5 Drawing Sheets

(56) References Cited

U.S. PATENT DOCUMENTS

2013/0138940 A1* 5/2013 Wang .................. G06F 11/1417
713/2
2013/0179872 A1* 7/2013 Kuzmack et al. ............ 717/173

OTHER PUBLICATIONS

Webopedia, Title—"Intelligent Platform Management Interface", p. 1, Aug. 28, 2012.*
Si-labs, Title—"Ethernet Controllers", p. 1, Jun. 20, 2012.*

* cited by examiner

SYSTEM AND METHOD FOR PROVIDING OUT-OF-BAND SOFTWARE OR FIRMWARE UPGRADES FOR A SWITCHING DEVICE

BACKGROUND

1. Technical Field

The present disclosure is related to systems and methods for upgrading the software or firmware of network switching devices. In particular, embodiments disclosed herein are related to systems and methods for providing out-of-band software or firmware upgrades to a network switching device.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include multiple components that require periodic software and firmware upgrades. However, software or firmware upgrades of information handling systems are often performed in-band, meaning that it is performed by a processor of the system being upgraded after the operating system has been booted. What is needed is a system and method for providing out-of-band software or firmware upgrades on an information handling system or device, in particular, a switching device.

SUMMARY

Consistent with some embodiments, there is provided an information handling system. The information handling system includes at least one network switch that includes at least one processing unit, a memory coupled to the at least one processing unit, the memory storing at least one image including instructions controlling functions of the at least network switch, and a baseband management controller coupled to the memory and the at least one processing unit, the baseband management controller receiving and storing at least one upgraded image for writing to the memory to replace the at least one image. The baseband management controller receives the at least one upgraded image from a remote terminal, powers off the at least one processing unit, and writes the at least one upgraded image to the memory while the at least one processing unit is powered off.

Consistent with some embodiments, there is also provided a level 2 (L2) network switch having out-of-band upgrade capabilities. The L2 network switch includes at least one processing unit, a memory coupled to the at least one processing unit, the memory storing at least one image including instructions controlling functions of the at least network switch, and a baseband management controller coupled to the memory and the at least one processing unit, the baseband management controller receiving and storing at least one upgraded image for writing to the memory to replace the at least one image. The baseband management controller receives the at least one upgraded image from a remote terminal, powers off the at least one processing unit, and writes the at least one upgraded image to the memory while the at least one processing unit is powered off.

Consistent with some embodiments, there is further provided a non-transitory computer-readable medium having instructions for execution by one or more processors that, when executed, cause the one or more processors to perform a method for upgrading at least one image including instructions controlling functions of a level 2 (L2) switch. The method includes receiving a request to establish a remote management session, receiving a command to power off at least one processing unit of the L2 switch, receiving at least one upgraded image, writing the upgraded image to a memory of the L2 switch, powering on the at least one processing unit of the L2 switch, and rebooting the L2 switch with the upgraded image.

These and other embodiments will be described in further detail below with respect to the following figures.

Figure 1:
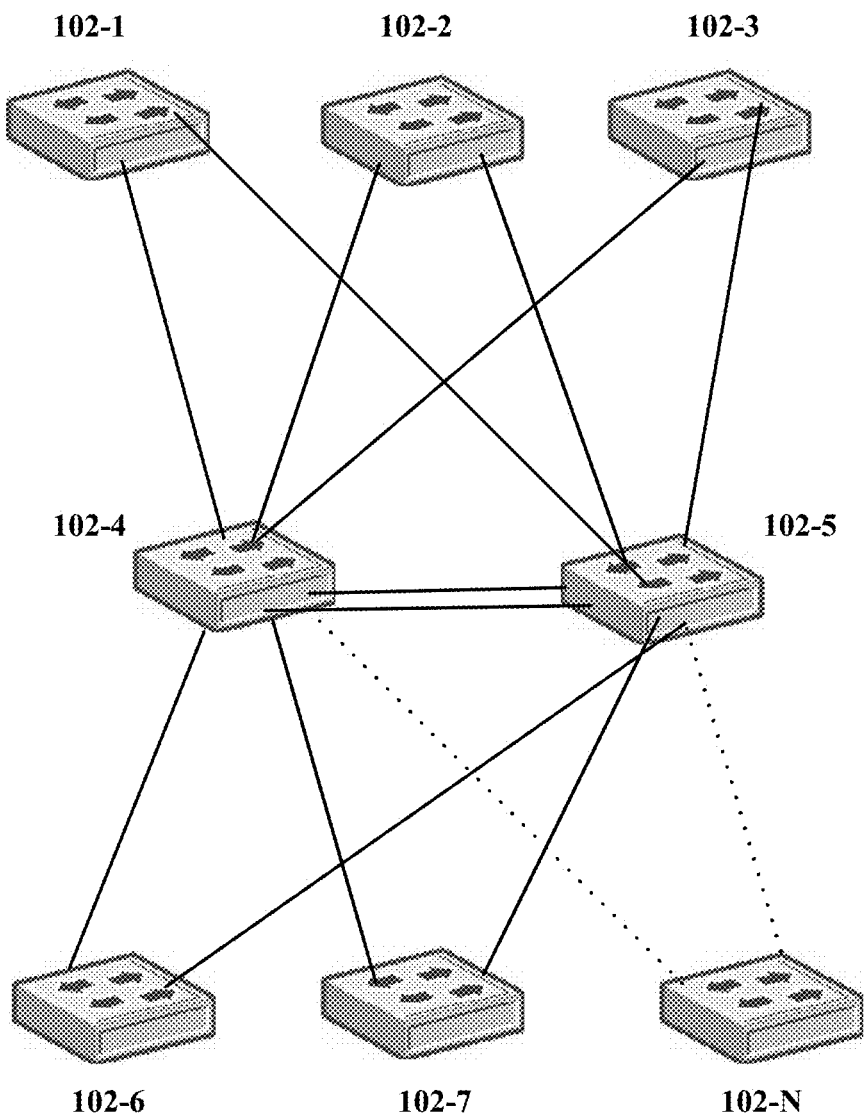
FIG. 1 shows an information handling system consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 shows an information handling system consistent with some embodiments. As shown in FIG. 1, information handling system 100 includes a plurality of devices 102-1-102-N coupled to each other in a linked or aggregated arrangement. Consistent with some embodiments, devices 102-1-102-N may include any appropriate combination of hardware and/or software having one or more processors and capable of reading instructions stored on a non-transitory machine-readable medium for execution by the one or more processors. According to some embodiments, devices 102-1-102-N (collectively referred to as devices 102) may correspond to a network switch and, in some embodiment, may correspond to a level two (L2) switch, a level three (L3) switch, or a combination switch capable of performing both L2 and L3 switching. Consistent with some embodiments devices 102-1-102-N include a machine-readable medium, such as a memory (not shown) that includes instructions for execution by one or more processors (not shown) for causing devices 102-1-102-N to perform specific tasks. For example, such instructions may include handling and routing information. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Consistent with some embodiments, devices 102-1 to 102-N are coupled together to transmit information between each other and to other devices coupled to devices 102-1-102-N. System 100 may represent a local area network, a wide area network, or a link aggregation group. Devices 102 may require periodic upgrades to the software or firmware running on the devices 102. For example, a boot loader, an operating system, and firmware images stored on a FLASH memory or a field programmable gate array (FPGA) or a complex programmable logic device (CPLD) may all need to be periodically upgraded during the life of devices 102.

Figure 2:
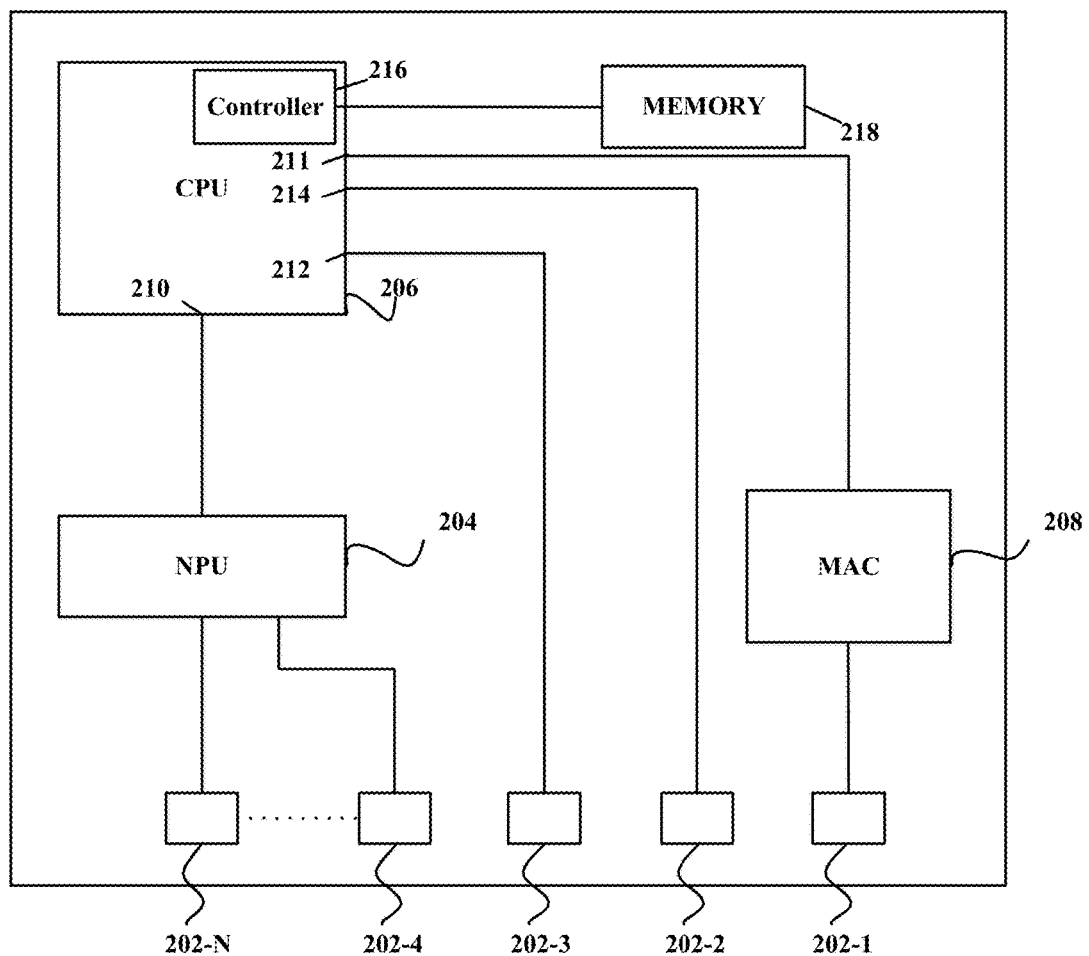
FIG. 2 is a diagram illustrating an information handling device, consistent with some embodiments.

FIG. 2 is a diagram illustrating an information handling device, consistent with some embodiments. Device 200 may correspond to any of devices 102 shown in FIG. 1 as part of information handling system 100. Moreover, device 200 may correspond to a network switching device, such as a level two (L2) switch or switching device, a level three (L3) switch or switching device, or a combination switch or switch or switching device capable of performing both L2 and L3 switching. As shown in FIG. 2, device 200 includes a plurality of access ports 202-1-202-N (collectively referred to as ports 202). Access ports 202-4-202-N are coupled to a network processing unit (NPU) 204, access ports 202-3 and 202-2 are coupled to a central processing unit 206, and access port 202-5 is coupled to a media access controller (MAC) controller circuit 208. Consistent with some embodiments, access ports 202-4-202-N may be ports for servers coupled to device 200, access port 202-3 may correspond to a USB port, and access ports 202-1 and 202-2 may correspond to RJ45 ports. The particular designation and coupling of ports 202 is not limiting and is shown for example. Other ports and couplings may be used in device 200 based on the function of device 200.

According to some embodiments, central processing unit (CPU) 206 may correspond to a host CPU of device 200 and may include a first peripheral component interconnect express (PCIe) port 210 coupled to network processor unit 204 and a second peripheral component interconnect express (PCIe) port 211 coupled to MAC controller for transmitting and receiving signals according to the PCIe standard. CPU 206 may also include a USB port 212 coupled to access port 202-3 for transmitting and receiving signals according to the USB standard. CPU 206 may further includes a universal asynchronous receiver/transmitter (UART) port 214 coupled to access port 202-2 for receiving signals from and transmitting signals to access port 202-2. CPU 206 may further include a controller 216 coupled to memory 218. Controller 216 may be a storage controller configured to write software or firmware images to memory 218 as part of an upgrade. CPU 206 may be configured to receive instructions from the firmware or software image written in memory that, when executed by CPU 206, cause CPU 206 to perform specific functions according to the firmware or software. Consistent with some embodiments, memory 218 may be volatile or non-volatile memory, and may be Read Only Memory (ROM), Electrically Erasable and Programmable ROM (EEPROM), or flash memory such as NAND, NOR or Serial Peripheral Interface (SPI) flash.

According to some embodiments, memory 218 stores an image of firmware or software such as a bootloader and operating system. Controller 216 may be configured to interface with memory 218 for programming memory 218 to write firmware or software images of a bootloader and an operating system. Moreover, controller 216 may be configured to interface with memory 218 for programming memory 218 to upgrade existing firmware or software such as a bootloader or an operating system. In operation, CPU 206 receives an upgrade image from an source external to device 200 over an access port 202. CPU 206 transmits instructions to controller 216 which then writes the upgrade image into a known partition of memory 218 having the firmware or software image that is being upgraded. However, this process is done in-band, when processor 206 is up and running. As a result, it the write process to memory fails or encounters problems, device 202 may encounter subsequent operating problems, and may fail altogether, if no suitable backups are available. In the industry, this is known as being "bricked" since device 200 becomes as useful as a brick. When device 200 becomes bricked, it is essentially non-functional and must be replaced. In enterprise environments, however, the failure of device 200 may result in downtime and added costs for replacing the failed device.

Figure 3:
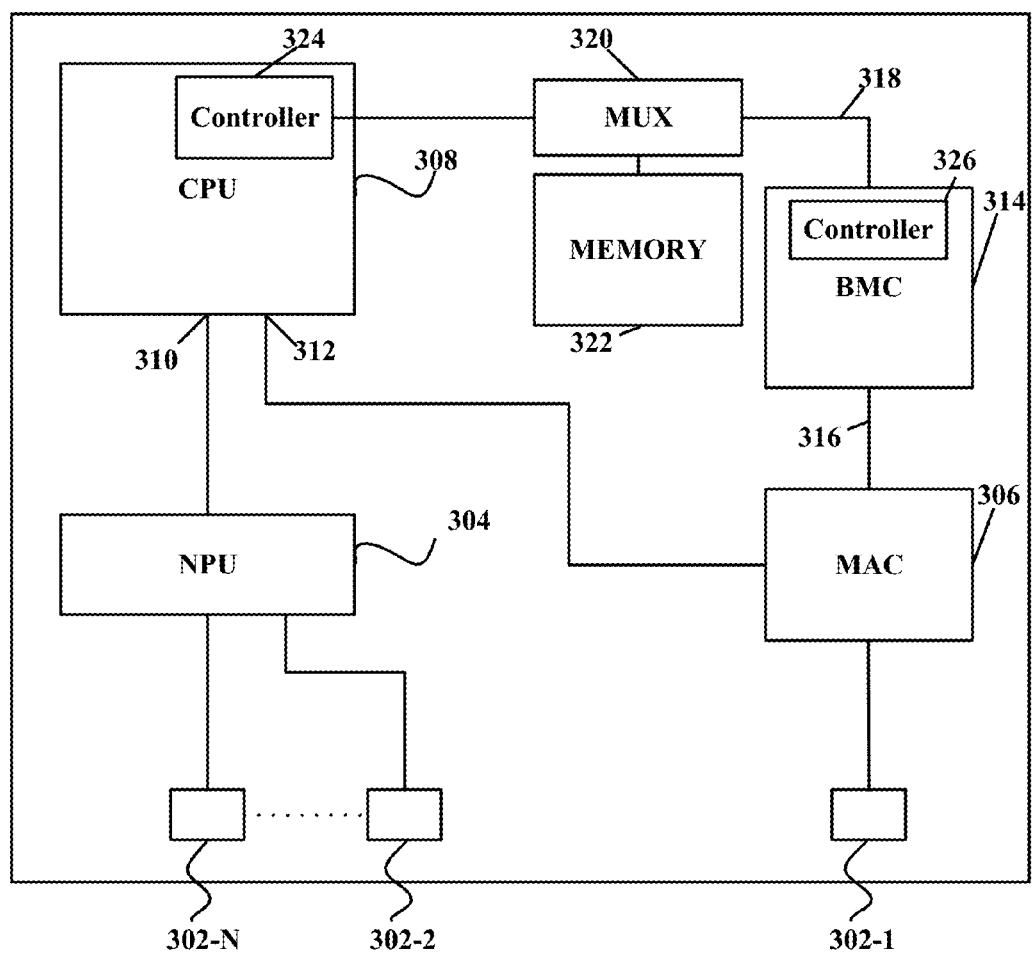
FIG. 3 is a diagram illustrating an information handling system including a terminal server, consistent with some embodiments.

FIG. 3 is a diagram illustrating an information handling device, consistent with some embodiments. Consistent with some embodiments, device 300 may correspond to a level two (L2) switch or switching device, a level three (L3) switch or switching device, or a combination switch or switch or switching device capable of performing both L2 and L3 switching. As shown in FIG. 3, device 300 is similar to device 200, but has a reduced number of access ports. Moreover, device 300 uses the Intelligent Platform Management Interface (IPMI) specification for providing remote management. IPMI is a message-based, hardware-level interface specification that operates independently of the operating system and allows users such as administrators to manage a system remotely in the absence of an operating system or the system management software. As a result of using the IPMI specification, device 300 is capable of performing out-of-band firmware and software upgrades that reduce, if not eliminate, the chance for bricking device 300.

Returning to FIG. 3, device 300 may correspond to any of devices 102 shown in FIG. 1 as part of information handling system 100. As shown in FIG. 3, device 300 includes a plurality of access ports 302-1-302-N (collectively referred to as ports 302). Access ports 302-2-302-N are coupled to a network processing unit (NPU) 304, and access port 302-1 is coupled to a media access controller (MAC) controller circuit 306. As further shown in FIG. 3, device 300 includes a central processing unit (CPU) 308 that may correspond to a host CPU of device 300 and may include a first PCIe port 310 coupled to network processor unit 304 and a second PCIe port 312 coupled to MAC controller 306 for transmitting and receiving information according to the PCIe standard. Consistent with some embodiments, access ports 302-2-302-N may be ports for servers coupled to device 300, and access port 302-1 may correspond to an RJ45 port. The particular designation and coupling of ports 302 is not limiting and is shown for example. Other ports and couplings may be used in device 300 based on the function of device 300.

Device 300 also includes a baseband management controller (BMC) 314 that is coupled to MAC controller 306 and CPU 308. BMC 314 is a microcontroller that provides management capabilities for device 300 according to the IPMI standard. According to some embodiments, BMC 314 is capable of implementing serial over local area network (LAN) (SOL) capabilities such that the serial input and output of a serial port, such as access port 302-1, can be redirected over the internet according to an internet protocol. According to some embodiments, BMC 314 may be capable of packaging serial data into network packets and unpackaging network packets, such as user datagram protocol (UDP) network packets, into serial data. Returning to FIG. 3, BMC 314 is coupled to MAC 306 via a side-band coupling 316 and is coupled to CPU 308 via a serial coupling 318 through multiplexer 320. Multiplexer 320 may be configured to allow either CPU 308 or BMC 314 to access memory 322. Consistent with some embodiments, information between BMC 314 and MAC controller 306 may be correspond to the Reduced Media Independent Interface (RMII) standard and information between BMC 314 and CPU 308 through multiplexer 320 may correspond to the UART standard. Further consistent with some embodiments, BMC 314 is powered by a separate, backup power supply (not shown) than CPU 308 and, thus, a user is capable of still accessing and managing device 300 even if device 300 is currently not receiving power. Consistent with some embodiments, the backup power supply may be available even if the main power supply powering device 300 and CPU 308 is cut or disabled such that BMC 314 can continue to operate. Device 300 further includes memory 322 for storing firmware or software images such as a bootloader or operating system for CPU 308 or for device 300. Consistent with some embodiments, memory 322 may be volatile or non-volatile memory, and may be Read Only Memory (ROM), Electrically Erasable and Programmable ROM (EEPROM), or flash memory such as NAND, NOR or Serial Peripheral Interface (SPI) flash. CPU 308 also includes a controller 324 and BMC includes a controller 326. Consistent with some embodiments, controllers 324 and 326 may be storage controllers configured to interface with memory 322 through multiplexer 320 for programming memory 322 to write firmware or software images such as a bootloader and an operating system. Moreover, controllers 324 and 326 may be configured to interface with memory 322 through multiplexer 320 for programming memory 322 to upgrade existing firmware or software images such as a bootloader or an operating system. Controllers 324 may receive instructions from CPU 308 for writing the firmware or software images to memory 322. Consistent with some embodiments, firmware or software images stored in memory may include instructions that, when executed by CPU 308, cause CPU 308 to perform specific functions according to the written firmware or software image.

In operation, an user at a terminal coupled to a network or the internet may transmit IPMI management information over internet protocol (IP) to device 300. This IPMI information may be packaged as UDP network packets and received at access port 302-1 and sent to MAC controller 306, and include commands for powering off CPU 308 and for upgrading the image stored in memory 322. MAC controller 306 will then analyze the MAC address of the received network packets and route over side-band coupling 316 to BMC 314. BMC 314 unpacks the IPMI commands from the UDP network packets and formats them to a serial format. BMC 314 then transmits the IPMI command to CPU 308 to power off CPU 308. BMC 314 then transmits a communication to multiplexer 320 to request access to memory 322. The user at the terminal then transmits the new image for upgrading device 300 over IP to device 300. The new image may be packaged as UDP network packets and received at access port 302-1 and sent to MAC controller 306. MAC controller 306 will then analyze the MAC address of the received network packets and route over side-band coupling 316 to BMC 314. BMC 314 unpacks the new image for upgrading device 300 from the UDP network packets and formats them to a serial format, which is then transmitted to multiplexer 320 over serial coupling 318. Consistent with some embodiments, BMC, or more particularly, controller 326, has analyzed the partitioning of memory 322 so that controller 326 is able to specify the particular partition to which the upgraded image is to be written within memory 322. Alternatively, the upgraded image received from the user may have the particular partition specified in the network packet. After the upgraded image has been written to the specified partition of memory 322, the user will transmit additional IPMI management commands to BMC 314, which are received by port 302-1 and transmitted through MAC controller 306 that include commands to turn power back on to CPU 308. BMC 314 receives these commands as network packets, converts them to serial data, and transmits the commands to CPU 308 over serial coupling 318 through multiplexer 318. When CPU 308 receives power, CPU 308 reboots with the upgraded firmware or software image written to memory 322.

Since BMC 314 and CPU 308 have separate power supplies, an upgrade may be performed with CPU 308 powered down and device 300 using BMC 314 as a processor to minimize the chance of the upgrade going wrong and bricking device 300. Further, since BMC 314 remains powered during the upgrade process, device 300 continues to operate normally. For example, if device 300 is a L2 switching device, device 300 may continue to perform L2 forwarding while CPU 308 is powered down and the image is being upgraded.

Figure 4:
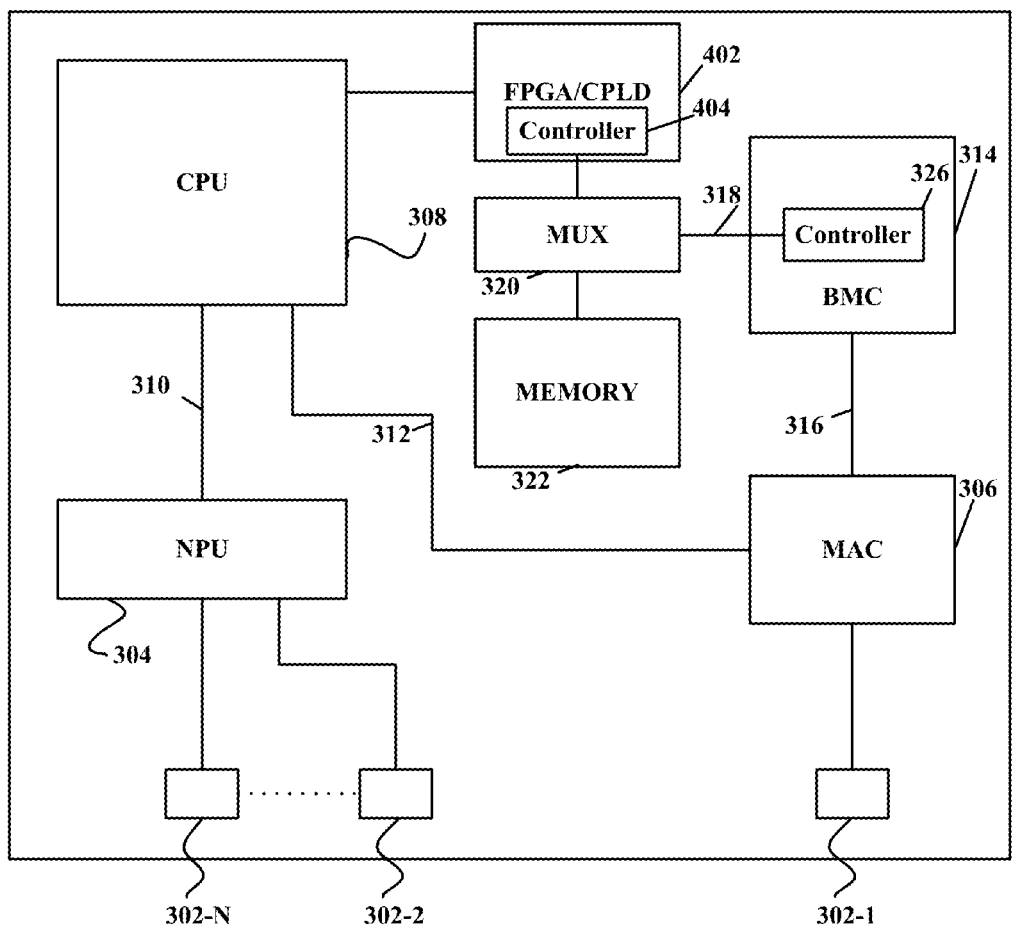
FIG. 4 is a diagram illustrating an information handling device, consistent with some embodiments.

FIG. 4 is a diagram illustrating an information handling device, consistent with some embodiments. Consistent with some embodiments, device 400 may correspond to an L2 switch or switching device. As shown in FIG. 4, device 400 is similar to device 300, but includes a programmable logic device 402 that includes a controller 404 for writing images of firmware or software to be programmed into memory 322 and for interacting with memory 322. Consistent with some embodiments, programmable logic device may be a FPGA or a CPLD, and may receive an upgraded image from a remote user through BMC 314, as described below. Returning to FIG. 4, device 400 may correspond to any of devices 102 shown in FIG. 1 as part of information handling system 100. As shown in FIG. 4, device 400 includes a plurality of access ports 302-1-302-N (collectively referred to as ports 302). Access ports 302-2-302-N are coupled to a network processing unit (NPU) 304, and access port 302-1 is coupled to a media access controller (MAC) controller circuit 306. As further shown in FIG. 4, device 400 includes a central processing unit (CPU) 308 that may correspond to a host CPU of device 400 and may include a first PCIe port 310 coupled to network processor unit 304 and a second PCIe port 312 coupled to MAC controller 306 for transmitting and receiving information according to the PCIe standard. Consistent with some embodiments, access ports 302-2-302-N may be ports for servers coupled to device 400, and access port 302-1 may correspond to an RJ45 port. The particular designation and coupling of ports 302 is not limiting and is shown for example. Other ports and couplings may be used in device 400 based on the function of device 300.

Device 400 also includes a baseband management controller (BMC) 314 that is coupled to MAC controller 306 and CPU 308. BMC 314 is a microcontroller that provides management capabilities for device 400 according to the IPMI standard. According to some embodiments, BMC 314 is capable of implementing serial over local area network (LAN) (SOL) capabilities such that the serial input and output of a serial port, such as access port 302-1, can be redirected over the internet according to an internet protocol. According to some embodiments, BMC 314 may be capable of packaging serial data into network packets and unpackaging network packets, such as user datagram protocol (UDP) network packets, into serial data. Returning to FIG. 4, BMC 314 is coupled to MAC 306 via a side-band coupling 316 and is coupled to CPU 308 via a serial coupling 318 through multiplexer 320 and programmable logic 402. Multiplexer 320 may be configured to allow either programmable logic device 402 or BMC 314 to access memory 322. Consistent with some embodiments, information between BMC 314 and MAC controller 306 may be correspond to the Reduced Media Independent Interface (RMII) standard and information between BMC 314 and CPU 308 through multiplexer 320 may correspond to the UART standard. Further consistent with some embodiments, BMC 314 is powered by a separate power supply than CPU 308 and, thus, a user is capable of still accessing and managing device 400 even if CPU 308 is currently not receiving power. Device 400 further includes memory 322 for storing images of firmware or software such as a bootloader or operating system for device 400. Consistent with some embodiments, memory 322 may be volatile or non-volatile memory, and may be Read Only Memory (ROM), Electrically Erasable and Programmable ROM (EEPROM), or flash memory such as NAND, NOR or Serial Peripheral Interface (SPI) flash. BMC includes a controller 326 that, along with controller 404, may be storage controllers configured to interface with memory 322 through multiplexer 320 for programming memory 322 to write a firmware or software image such as a bootloader and an operating system. Moreover, controllers 404 and 326 may be configured to interface with memory 322 through multiplexer 320 for programming memory 322 to upgrade existing firmware or software such as a bootloader or an operating system. Controller 404 may receive instructions from CPU 308 for writing the firmware or software image in memory 322. The firmware or software image written in memory 322 may include instructions that, when executed by programmable logic 402, cause programmable logic 402 to perform specific functions according to the firmware or software image.

In operation, an user at a terminal coupled to a network or the internet may transmit IPMI management information over internet protocol (IP) to device 400. This IPMI information may be packaged as UDP network packets and received at access port 302-1 and sent to MAC controller 306, and include commands for powering off CPU 308 and for upgrading the firmware or software image stored in memory 322. MAC controller 306 will then analyze the MAC address of the received network packets and route over side-band coupling 316 to BMC 314. BMC 314 unpacks the IPMI commands from the UDP network packets and formats them to a serial format. BMC 314 then transmits the IPMI command to CPU 308 to power off CPU 308. BMC 314 then transmits a communication to multiplexer 320 to request access to memory 322. The user at the terminal then transmits the new firmware or software image for upgrading programmable logic 402 of device 400 over IP to device 400. The new firmware or software image may be packaged as UDP network packets and received at access port 302-1 and sent to MAC controller 306. MAC controller 306 will then analyze the MAC address of the received network packets and route over side-band coupling 316 to BMC 314. BMC 314 unpacks the new firmware or software image for upgrading programmable logic 402 of device 400 from the UDP network packets and formats them to a serial format, which is then transmitted to multiplexer 320 over serial coupling 318. Consistent with some embodiments, BMC, or more particularly, controller 326, has analyzed the partitioning of memory 322 so that controller 326 is able to specify the particular partition to which the upgraded firmware or software is to be written within memory. Alternatively, the upgraded firmware or software received from the user may have the particular partition specified in the received network packet. After the upgraded firmware or software has been written to the specified partition of memory 322, the user will transmit additional IPMI management commands to BMC 314, which are received by port 302-1 and transmitted through MAC controller 306 that include commands to turn power back on to CPU 308. BMC 314 receives these commands as network packets, converts them to serial data, and transmits the commands to CPU 308 over serial coupling 318 through multiplexer 318. When CPU 308 receives power, programmable logic 402 reboots with the upgraded firmware or software image from memory 322.

Since BMC 314 and CPU 308 have separate power supplies, an upgrade may performed with CPU 308 powered down and device 400 using BMC 314 as a processor to minimize the chance of the upgrade going wrong and bricking device 400. Further, since BMC 314 remains powered during the upgrade process, device 400 continues to operate normally. For example, if device 400 is a L2 switching device, device 400 may continue to perform L2 forwarding while CPU 308 is powered down and the firmware or software is being upgraded.

Figure 5:
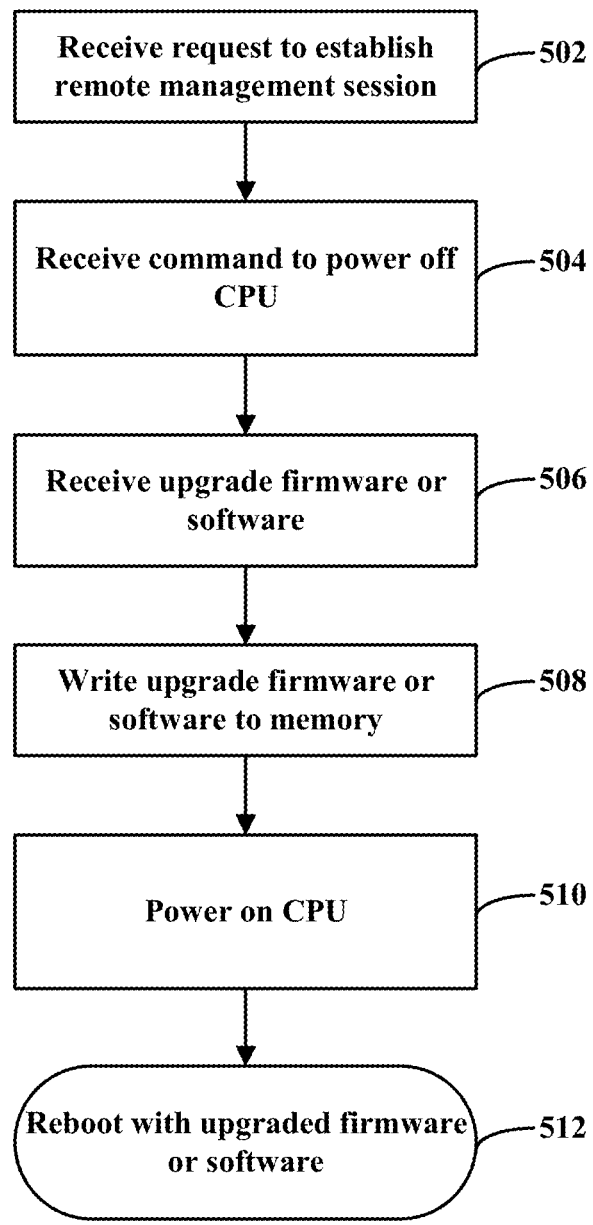
FIG. 5 is a flowchart illustrating a method for providing out-of-band upgrades to a networking device such as a L2 switch, consistent with some embodiments.

FIG. 5 is a flowchart illustrating a method for providing out-of-band upgrades to a networking device such as a L2 switch, consistent with some embodiments. For the purpose of illustration, FIG. 5 will be described with reference to FIGS. 3 and 4. Method 500 may be embodied in computer-readable instructions for execution by one or more processors in device 300 and/or 400, including BMC 314. As shown in FIG. 5, method 500 begins when device 300/400 receives a request to establish a remote management session (502). The request to establish a remote management session may be received from a remote terminal communicating over a network such as the internet. Moreover, the request may be a UDP network packet received by access port 302-1. Once the remote management session has been established, device 300/400 may then receive a command to power off CPU 308 (504). The command may be part of IPMI management information received by access port 302-1 from a network such as the internet and may be a UDP network packet. BMC 314 receives this command as a UDP network packet from access port 302-1 following a routing by MAC controller 306 and converts the network packet into a serial command that is transmitted to CPU 308. Device 300/400 then receives the firmware or software image for upgrade (506). The firmware or software image may be received by access port 302-1 from a network such as the internet and may be a UDP network packet. BMC 314 receives the firmware or software image as a UDP network packet from access port 302-1 following a routing by MAC controller 306 and converts the network packet into a serial command that is written to memory 322 by controller 326 once multiplexer 320 has given access to memory 322 to BMC 314. The stored firmware or software image is then written to memory 322 (508). Consistent with some embodiments, BMC 314 or, more specifically, controller 326 knows the partitioning layout of memory 322 and writes the stored firmware or software image to the correct partition of memory 322. Alternatively, the correct partition of memory 322 to write the stored firmware or software image to may be included as part of the UDP network packet that is received by BMC 314. After the firmware or software image has been written to memory 322, CPU 308 is powered on (510). Consistent with some embodiments, a command may be received by BMC 314 for powering on CPU 308. Alternatively, BMC may automatically power on CPU 308 after the firmware or software image write has been finished. Finally, CPU 308 reboots with the upgraded firmware or software image (512). In some embodiments, device 300/400 may include programmable logic 402, wherein the firmware or software is for programming programmable logic 402 and when CPU 308 is powered on, programmable logic 402 reboots with the upgrade firmware or software image.

Consistent with embodiments described herein, there is provided systems and methods for providing out-of-band firmware or software upgrades to network switching devices that utilize the IPMI standard to power off the PCU of the network switching devices during the upgrades to minimize catastrophic upgrade failures. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system, comprising:
   at least one network switch, the at least one network switch comprising:
      a memory storing at least one image that includes runtime instructions for running an operating system of the at least one network switch;
      at least one processing unit coupled to the memory and configured to read the runtime instructions from the memory when running the operating system of the at least one network switch; and
      a baseband management controller coupled to the memory,
      wherein the baseband management controller is configured to:
         receive a command as a network packet to power off the at least one processing unit,
         convert the command into a serial command,
         transmit the converted command to the at least one processing unit over a serial coupling through a multiplexer,
         receive at least one upgraded image that includes upgraded runtime instructions for running the operating system of the at least one network switch from a remote terminal,
         power off the at least one processing unit,
         write the at least one upgraded image to the memory while the at least one processing unit is powered off, and
         maintain operation of the at least one network switch while writing the at least one upgraded image to the memory, while the at least one processing unit is powered off and while the operating system is not running.

2. The information handling system according to claim 1, wherein the at least one network switch comprises a level 2 (L2) switch.

3. The information handling system according to claim 1, wherein the at least one processing unit executes the runtime instructions included in the at least one image to control functions of the at least one network switch.

4. The information handling system according to claim 1, further comprising a programmable logic device coupled to the memory, wherein the programmable logic device executes the runtime instructions included in the at least one image to control functions of the at least one network switch.

5. The information handling system according to claim 4, wherein the programmable logic device comprises at least one of a field programmable gate array (FPGA) and a complex programmable logic device (CPLD).

6. The information handling system according to claim 1, wherein the at least one image includes at least one of a bootloader and the operating system.

7. The information handling system according to claim 1, wherein the baseband management controller is configured to receive the at least one upgraded image from a remote terminal, power off the at least one processing unit, and write the at least one upgraded image to the memory while the at least one processing unit is powered off by Intelligent Platform Management Interface (IPMI) messages received from a remote terminal.

8. A level 2 (L2) network switch having out-of-band upgrade capabilities, comprising:
   a memory storing at least one image that includes runtime instructions for running an operating system of the L2 network switch;
   at least one processing unit coupled to the memory and configured to read the runtime instructions from the memory to run the operating system of the L2 network switch; and a baseband management controller coupled to the memory, wherein the baseband management controller is configured to:
receive a command as a network packet to power off the at least one processing unit,
convert the command into a serial command,
transmit the converted command to the at least one processing unit over a serial coupling through a multiplexer,
receive at least one upgraded image that includes upgraded runtime instructions for running the operating system of the L2 network switch from a remote terminal,
power off the at least one processing unit,
write the at least one upgraded image to the memory while the at least one processing unit is powered off, and
maintain operation of the L2 network switch while writing the at least one upgraded image to the memory, while the at least one processing unit is powered off and while the operating system is not running.

9. The L2 network switch according to claim 8, wherein the at least one processing unit executes the runtime instructions included in the at least one image to control functions of the L2 network switch.

10. The L2 network switch according to claim 8, further comprising a programmable logic device coupled to the memory, wherein the programmable logic device executes the runtime instructions included in the at least one image to control functions of the L2 network switch.

11. The L2 network switch according to claim 10, wherein the programmable logic device comprises at least one of a field programmable gate array (FPGA) and a complex programmable logic device (CPLD).

12. The L2 network switch according to claim 8, wherein the at least one image includes at least one of a bootloader and the operating system.

13. The L2 network switch according to claim 8, wherein the baseband management controller is configured to receive the at least one upgraded image from a remote terminal, power off the at least one processing unit, and write the at least one upgraded image to the memory while the at least one processing unit is powered off by Intelligent Platform Management Interface (IPMI) messages received from a remote terminal.

14. A non-transitory computer-readable medium having instructions for execution by one or more processors that, when executed, cause the one or more processors to perform a method for upgrading at least one image stored in a memory including runtime instructions for running an operating system of a level 2 (L2) switch, the method comprising:
receiving a request to establish a remote management session;
receiving a command as a network packet to power off at least one processing unit of the L2 switch, the at least one processing unit coupled to the memory and configured to read the runtime instructions from the memory to run the operating system of the L2 switch;
converting the command into a serial command;
transmitting the converted command to the at least one processing unit over a serial coupling through a multiplexer;
powering off the at least one processing unit of the L2 switch;
receiving at least one upgraded image that includes upgraded runtime instructions for running the operating system of the L2 switch from a remote terminal;
writing, while the at least one processing unit is powered off, the upgraded image to the memory of the L2 switch;
maintaining operation of the L2 switch while writing the upgraded image to the memory, including while the at least one processing unit of the L2 switch is powered off and while the operating system is not running;
powering on the at least one processing unit of the L2 switch; and
rebooting the L2 switch with the upgraded image.

15. The method according to claim 14, further comprising accessing the memory of the L2 switch using a multiplexer.

16. The method according to claim 14, wherein the command comprises an Intelligent Platform Management Interface (IPMI) command messages.

17. The method according to claim 14, wherein the at least one processing unit comprises a host processor of the L2 switch.

18. The method according to claim 17, wherein the host processor executes the runtime instructions of the at least one image for controlling functions of the L2 switch.

19. The method according to claim 14, wherein a programmable logic device executes the runtime instructions of the at least one image for controlling functions of the L2 switch.

20. The method according to claim 19, wherein the programmable logic device comprises at least one of a field programmable gate array (FPGA) and a complex programmable logic device (CPLD).

* * * * *